J. T. GREGORY.
AIRPLANE SAFETY DEVICE.
APPLICATION FILED JAN. 5, 1918.
1,268,710.
Patented June 4, 1918.
3 SHEETS—SHEET 2.
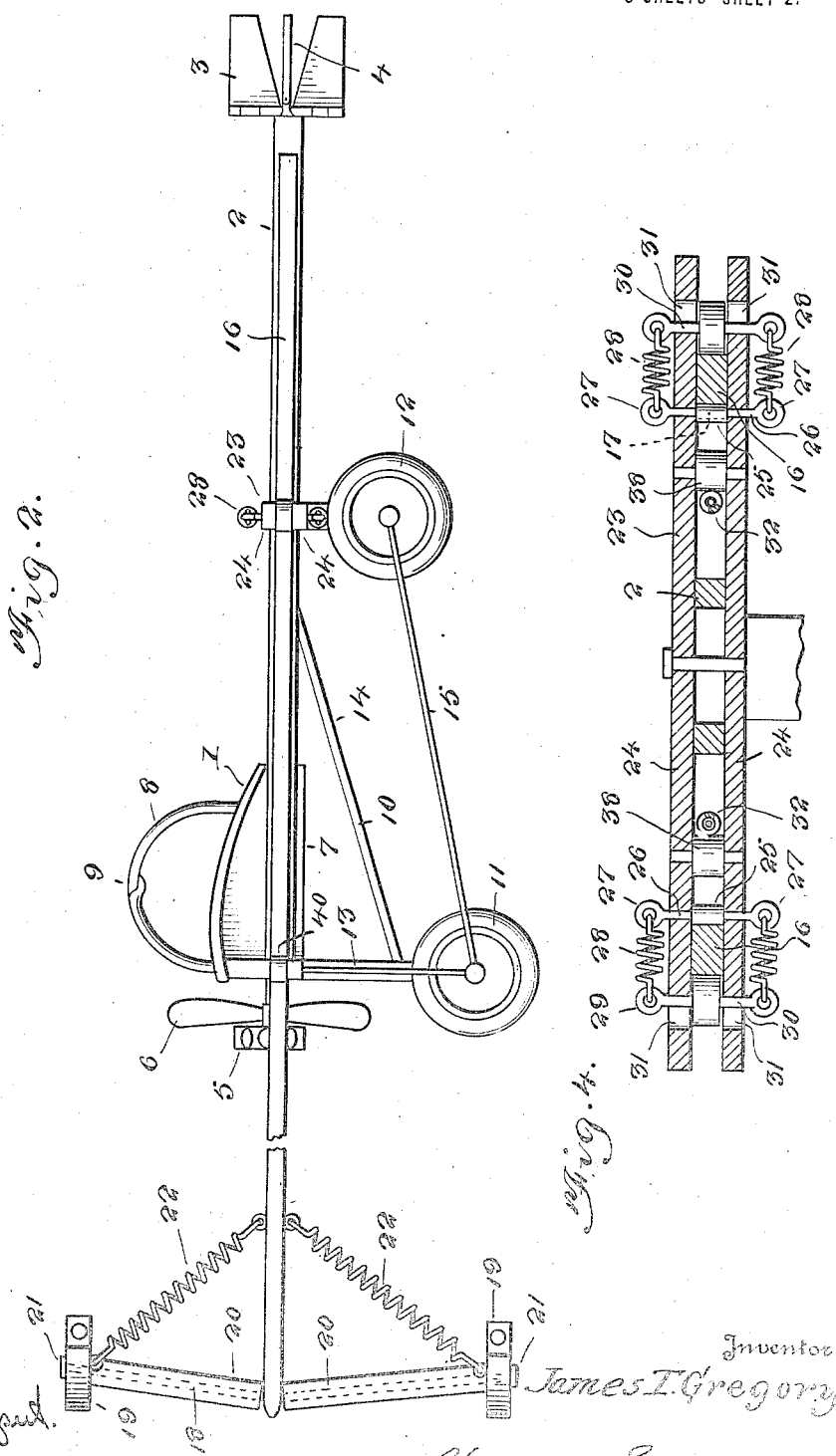

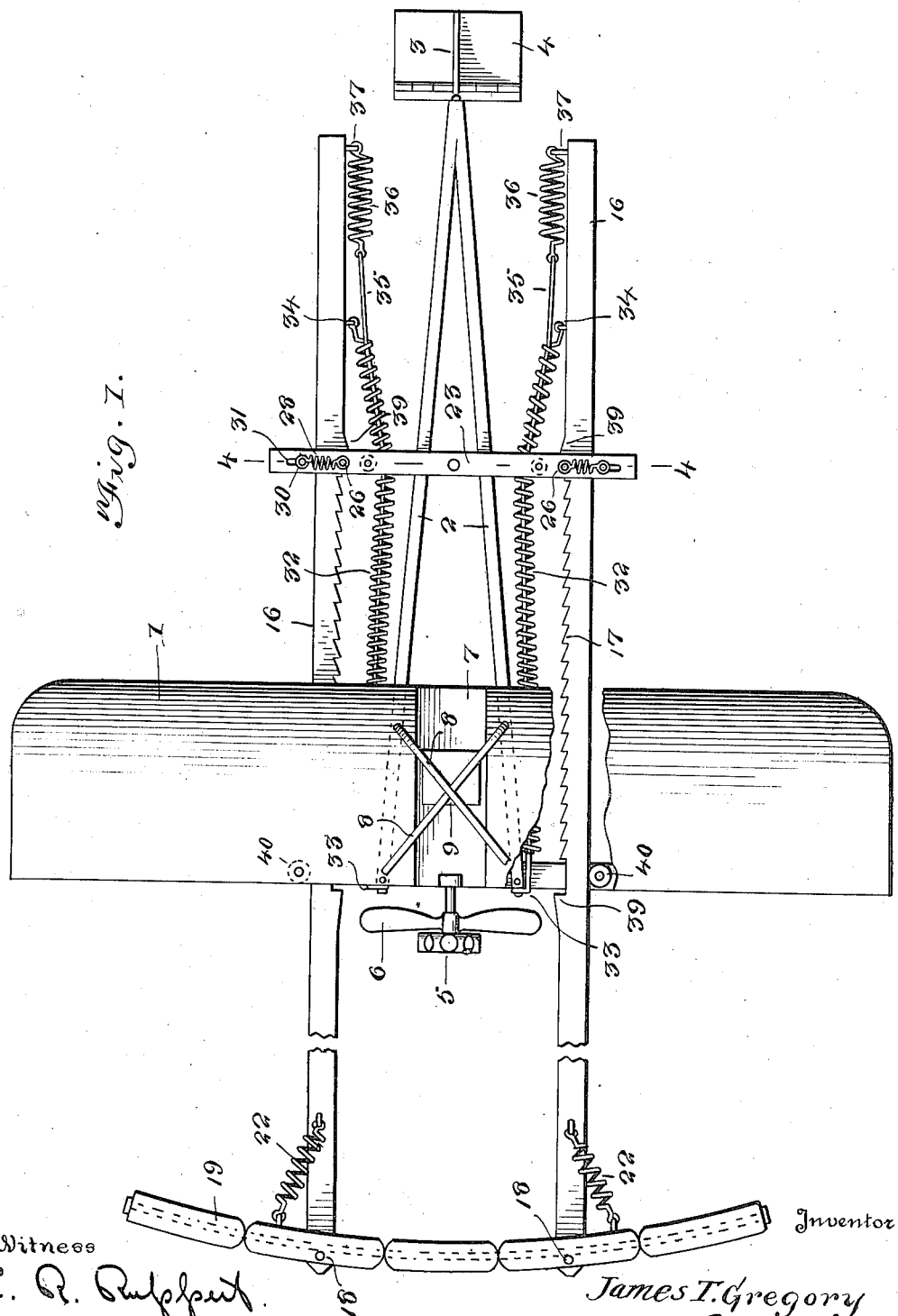

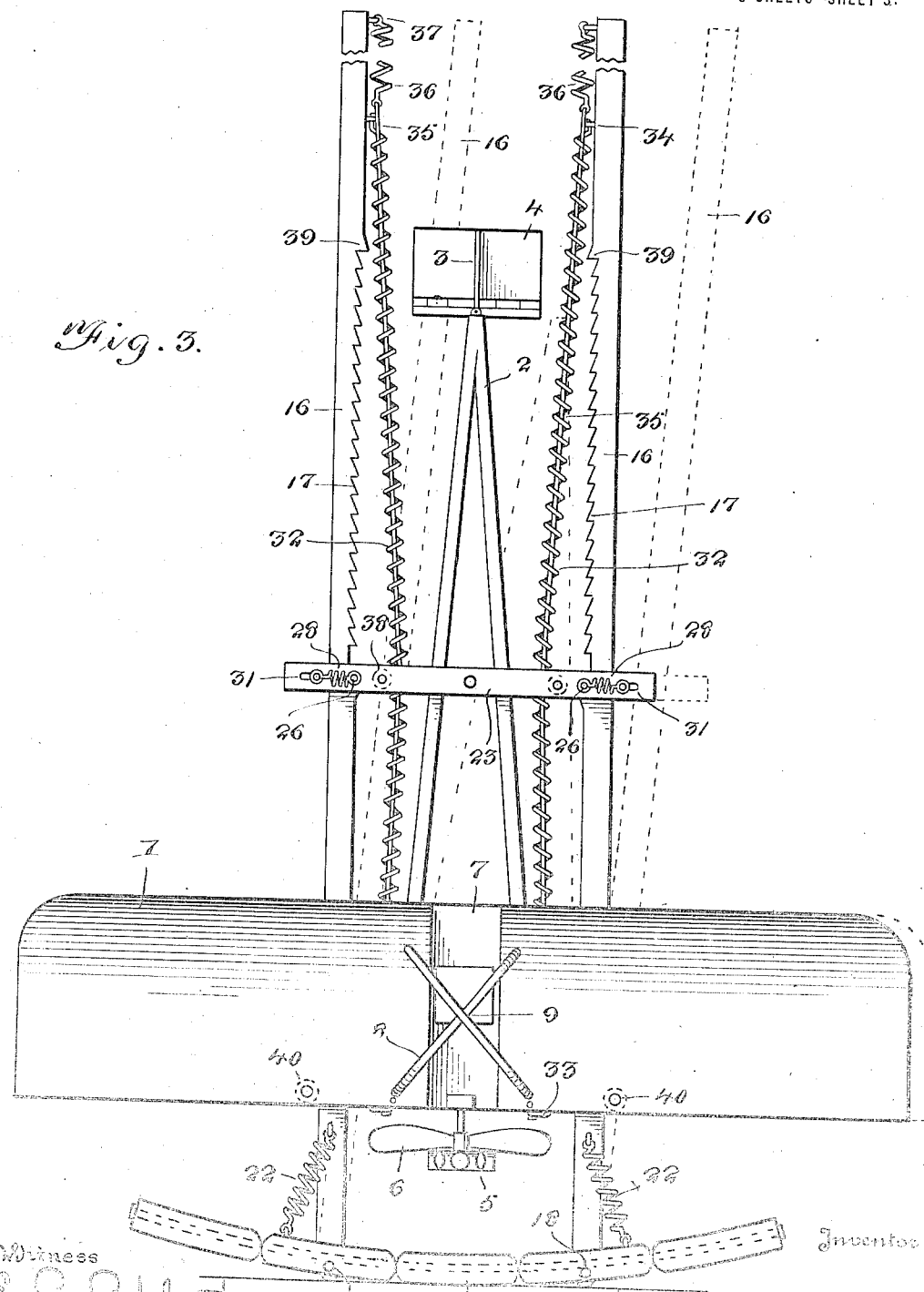

UNITED STATES PATENT OFFICE.

JAMES T. GREGORY, OF WASHINGTON, DISTRICT OF COLUMBIA.

AIRPLANE SAFETY DEVICE.

1,268,710.     Specification of Letters Patent.     Patented June 4, 1918.

Application filed January 5, 1918. Serial No. 210,468.

*To all whom it may concern:*

Be it known that I, JAMES T. GREGORY, a citizen of the United States, residing at Washington, in the District of Columbia, have invented new and useful Improvements in Airplane Safety Devices, of which the following is a specification.

This invention relates to airplane safety devices, the broad object in view being to produce a safety device which may be attached to and used in conjunction with any airplane and which will provide for emergency landings, as for example, when the machine is out of control or in case the aviator has been injured to an extent which prevents him from negotiating a landing in the usual way.

A further object of the invention is to provide a device of the general character above referred to which has sufficient flexibility to admit of quite a wide variation of the angle of the airplane with respect to the surface of the earth without the safety device being rendered inoperative as a shock absorber or bumper.

A further object in view is to provide separately operable cushioning means which may be successively brought into use in case of an unusually hard landing.

Another object in view is to provide means for protecting the aviator when a head on landing is made, preventing the aviator from being thrown from his position in the machine and seriously injured.

With the above and other objects in view, the invention consists in the novel construction, combination and arrangement of parts, as herein described, illustrated and claimed.

In the accompanying drawings,

Figure 1 is a plan view of an airplane showing the emergency landing gear in its applied relation thereto.

Fig. 2 is a side elevation of the same.

Fig. 3 is a view looking toward the top surface of the airplane, showing the manner in which the safety landing gear operates when a head on landing is effected.

Fig. 4 is an enlarged section on the line 4—4 of Fig. 1.

In the drawings, I have conventionally shown an airplane which is illustrated as of the monoplane type, the same embodying the main supporting surface or wings 1, the tail frame or fuselage 2, the vertical rudder 3, horizontal rudder 4, engine 5 and tractor propeller 6, all of said parts being of the ordinary construction and arrangement. Extending over the aviator's compartment 7 is a protecting cage or guard consisting of arched rods or members 8 terminally fastened to the frame structure at their lower ends and crossing or intersecting each other centrally at the point 9. In case a head on landing should be made, the protecting cage will prevent the aviator from being hurled from the machine upon the ground, and thereby seriously injured. The frame structure is mounted on a suitable landing base, designated generally at 10, and comprising one or more front wheels 11, one or more rear wheels 12 and suitable braces 13, 14 and 15.

The landing gear comprises a pair of guide rails or track members 16 arranged in parallel and spaced relation to each other and formed with rack faces 17 on their inner faces. At their forward ends, the guide rails or track members 16 are connected by pivots 18 with a pair of flexible arcuate bumper rails 19 enabling the guide rails or track members 16 to assume any necessary angle in relation to the bumper rails as indicated by dotted lines in Fig. 3, when the machine lands at an angle other than one perpendicular to the surface of the earth. The flexible bumper rails 19 are connected to the forward extremities of the guide rails or track members 16 by means of the pivots 18 which are in the form of tie rods as shown in Fig. 2, yieldable lateral braces 20 of spring metal, through which the tie rods or flexible stays 18 extend centrally and longitudinally, the opposite extremities of the members 18 being headed as indicated at 21 to prevent displacement thereof. Yieldable means such as contractile springs 22 are connected at their outer extremities to the flexible bumper rails 19 and extend therefrom inwardly and rearwardly where they are connected at their opposite ends to the guide rails or track members 16. By means of the construction hereinabove described, a very flexible apparatus or landing gear is provided which takes care of the airplane when landing head on at various angles. The springs 22 act as centering springs to yieldingly hold the track members or guide rails 16 substantially perpendicular to the bumper rails 19.

Extending transversely of and across the guide rails 16 is a traveler bar 23, the construction of which is best illustrated in Fig.

4, said traveler bar comprising two members 24 arranged in spaced parallel relation to each other above and below the bars of the tail frame 2 and also above and below the guide rails or track members 16. Arranged between the bars 24 are detent rollers 25 adapted to engage the rack faces 17 above referred to and roll over the same. Each roller 25 is mounted on a fixed shaft 26 which extends through the members 24 and is provided at its opposite ends with eyes 27 to which are connected the adjacent ends of contractile springs 28, the opposite extremities of which are connected to eyes 29 at the opposite extremities of a laterally shiftable shaft 30 mounted for back and forth movement in slots 31, in the members 24. The springs 28 serve to press the adjacent guide rail or track member into firm frictional engagement with the adjacent detent roller 25 so as to normally sustain the parts in the carrying position illustrated in Fig. 1.

Main springs 32 are connected at their forward extremities at the points 33 to the frame of the airplane, and are connected at their opposite extremities at the points 34 to the guide rails or track members 16. Flexible and normally slack restrainers or stays 35 such as ropes or cables extend through the main springs 32 and are attached at their rear extremities to auxiliary springs 36 which are in turn attached at 37 to the rear extremities of the rails 16. The forward extremities of the restrainers 35 are connected to the frame of the airplane. The springs 32 engage the inner faces of rollers or guides 38, the latter keeping said springs clear of the guide rails or track members and the frame of the airplane. When the parts are in their normal carrying positions, the frame of the airplane rests in close proximity to or against stop shoulders 39 on the inner faces of the guide rails or track members 16. Rollers 40 journaled on the frame of the airplane bear against the outer faces of the guide rails 16 thereby holding the airplane and the landing gear in a certain definite relation to each other.

From the foregoing description taken in connection with the accompanying drawings, the operation of the safety landing gear will be best understood by reference to Fig. 3 which shows the frame of the landing gear and also the frame of the airplane vertically disposed. When the flexible bumper rails come in contact with the ground, the airplane starts its travel downwardly on the guide rails or track members 16, the detent rollers traveling rapidly over the ratchet faces of said guide rails. During this movement of the airplane, the main springs 32 are first stretched and will ordinarily be strong enough to cushion and arrest the downward movement of the airplane. In an exceptionally hard landing, the flexible restrainers or stays 35 bring the auxiliary springs 36 into play and the latter yieldingly arrest the further movement of the airplane. Due to the flexibility of the structure of the emergency landing gear, the machine may be landed safely at quite a wide variance from a truly vertical path as indicated by dotted lines in Fig. 3. Fig. 2 shows that the guide rails may swing at their upper ends toward either side or toward either of the bumper rails 19. The landing gear may be used in conjunction with airplanes employed for various purposes, such as training machines, or military machines which are required to fly over the enemy and which may be put out of control so as to render the ordinary landing impracticable.

While I have shown the landing gear applied to the monoplane of the tractor type, it will, of course, be understood that the landing gear may be used in connection with any type of airplane with equal advantage.

I claim:

1. In combination with an air craft, a landing gear comprising a bumper arranged in advance of the airplane, guiding means extending rearwardly from said bumper to a point in rear of the supporting surface of the airplane, and yieldable means interposed between said guiding means and the airplane and serving to yieldingly resist the movement of the airplane toward said bumper.

2. In combination with an air craft, a landing gear comprising a bumper arranged in advance of the airplane, guiding means extending rearwardly from said bumper to a point in rear of the supporting surface of the airplane, and yieldable means interposed between said guiding means and the airplane and serving to yieldingly resist the movement of the airplane toward said bumper, said guiding means extending substantially at a right angle to the bumper, and yieldable means for maintaining the bumper at such angle.

3. In combination with an air craft, a landing gear comprising a bumper arranged in advance of the airplane, guiding means extending rearwardly from said bumper to a point in rear of the supporting surface of the airplane, yieldable means interposed between said guiding means and the airplane and serving to yieldingly resist the movement of the airplane toward said bumper, said guiding means extending substantially at a right angle to the bumper, yieldable means for maintaining the bumper at such angle, and the guiding means having a pivotal connection with each other.

4. In combination with an air craft, a landing gear comprising a bumper arranged in advance of the airplane, guiding means extending rearwardly from said bumper to a point in rear of the supporting surface of the airplane, yieldable means interposed between said guiding means and the airplane and serving to yieldingly resist the movement of the airplane toward said bumper, said guiding means embodying a ratchet face, a traveler secured to and movable with the frame of the airplane, and a detent on said traveler engaging said ratchet face.

5. In combination with an air craft, a landing gear comprising a bumper arranged in advance of the airplane, guiding means extending rearwardly from said bumper to a point in rear of the supporting surface of the airplane, yieldable means interposed between said guiding means and the airplane and serving to yieldingly resist the movement of the airplane toward said bumper, auxiliary yieldable means for cushioning the movement of the airplane toward the bumper, and flexible means for bringing said auxiliary yieldable means into action after the first named yieldable means has permitted the airplane to move through a portion of its travel.

6. In combination with an air craft, a landing gear comprising a bumper arranged in advance of the airplane, guiding means extending rearwardly from said bumper to a point in rear of the supporting surface of the airplane, yieldable means interposed between said guiding means and the airplane and serving to yieldingly resist the movement of the airplane toward said bumper, and said bumper being composed of flexibly connected sections, certain of which have a jointed connection with the adjacent end of the guiding means.

7. The combination with an airplane, of landing gear comprising a plurality of arcuate flexible bumpers arranged in front of the airplane structure, guide rails having their forward ends pivotally connected with said bumpers, yieldable braces interposed between said guide rails and bumpers, yieldable centering means connecting said bumpers with said guide rails, said guide rails extending in rear of the supporting surface of the airplane, a traveler carried by the frame of the airplane and slidable along said guide rails, yieldable means interposed between said guide rails and the airplane for resisting the movement of the latter toward the bumpers, and means for normally sustaining the airplane at the rearward limit of its movement with respect to the landing gear.

8. In combination with an air craft, a landing gear comprising a bumper arranged in advance of the airplane, guiding means extending rearwardly from said bumper to a point in rear of the supporting surface of the airplane, yieldable means interposed between said guiding means and the airplane and serving to yieldingly resist the movement of the airplane toward said bumper, and a protecting cage fastened to the frame of the airplane and extending over the aviator's position, said cage embodying arched and cross rods.

In testimony whereof I affix my signature.

JAMES T. GREGORY.

Copies of this patent may be obtained for five cents each, by addressing the "Commissioner of Patents, Washington, D. C."